May 19, 1964 J. A. MAURER 3,133,486
FOCAL PLANE SHUTTER MECHANISM
Filed June 9, 1961 5 Sheets—Sheet 1
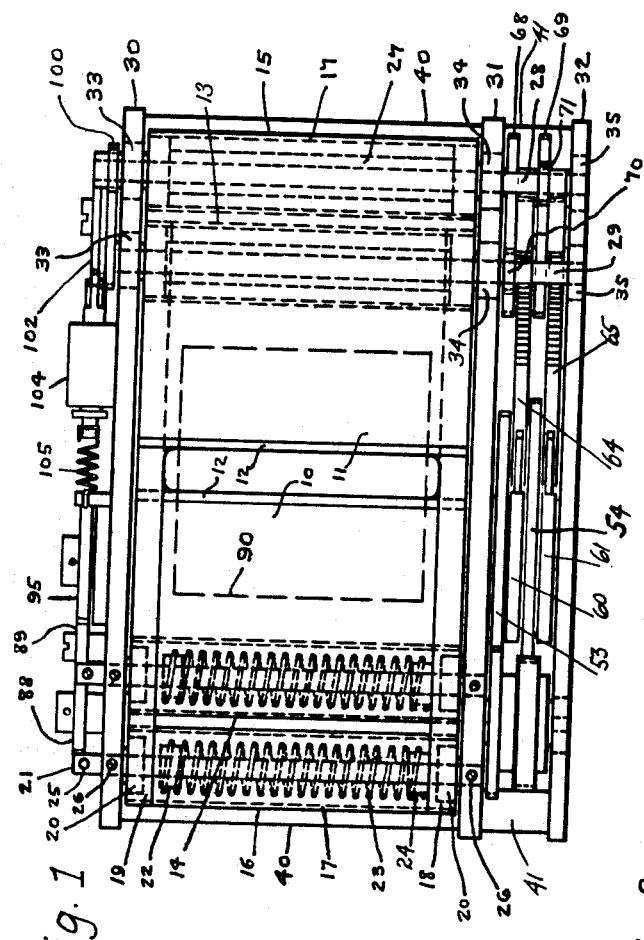
INVENTOR.
J. A. MAURER
BY
ATTORNEY May 19, 1964     J. A. MAURER     3,133,486
FOCAL PLANE SHUTTER MECHANISM
Filed June 9, 1961     5 Sheets-Sheet 2
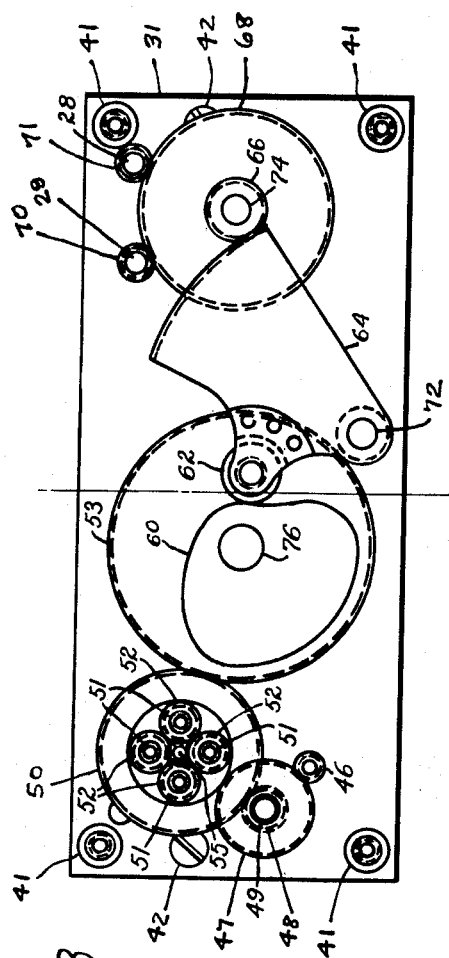
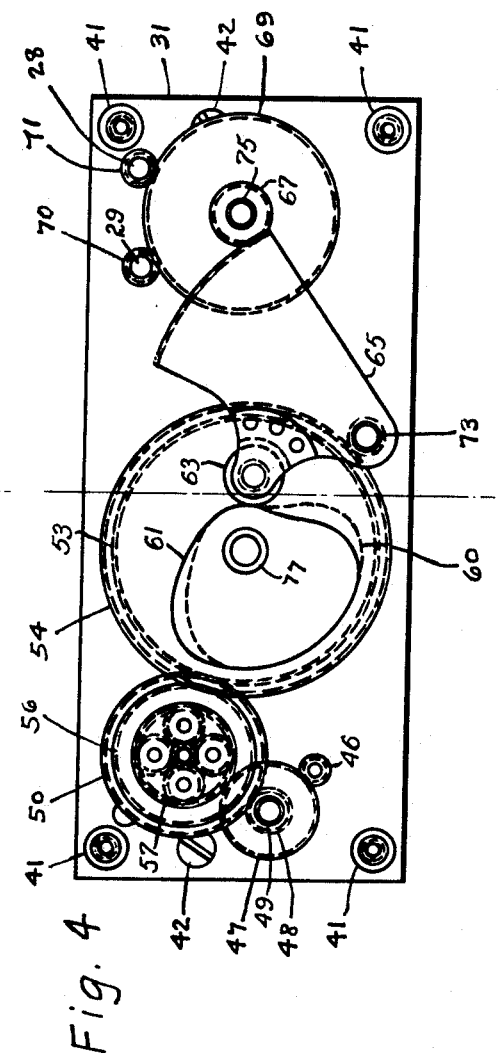
INVENTOR.
J. A. MAURER
ATTORNEY

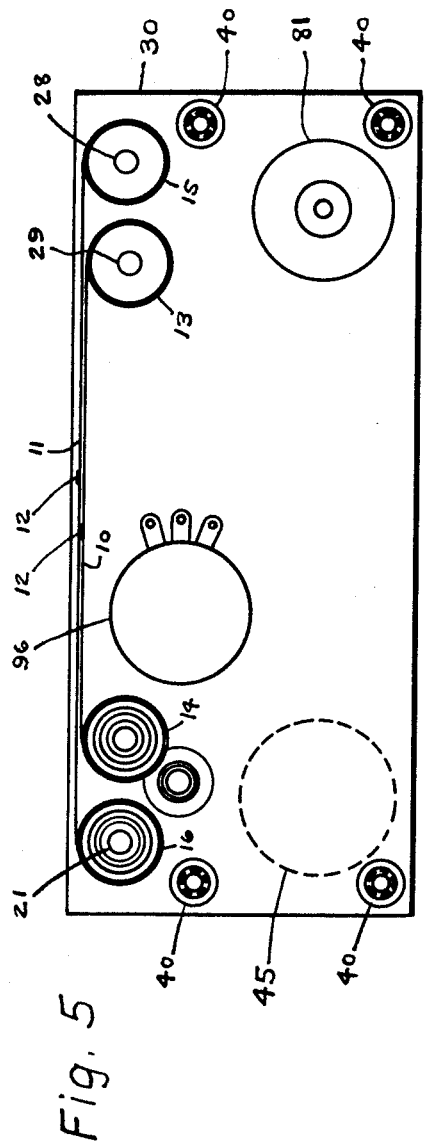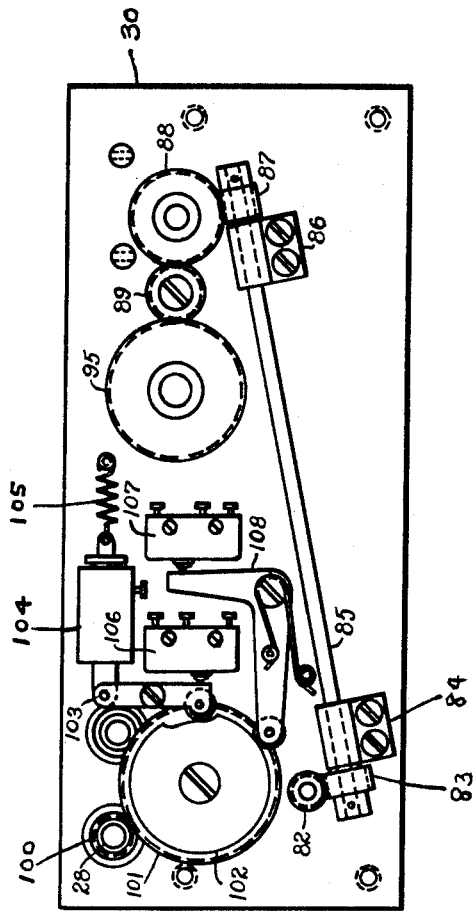

May 19, 1964　　　J. A. MAURER　　　3,133,486
FOCAL PLANE SHUTTER MECHANISM
Filed June 9, 1961　　　　　　　　　　　　5 Sheets-Sheet 4

INVENTOR.
J. A. MAURER
BY
　　Wille
　　　ATTORNEY

May 19, 1964     J. A. MAURER     3,133,486
FOCAL PLANE SHUTTER MECHANISM

Filed June 9, 1961                         5 Sheets—Sheet 5

INVENTOR.
J. A. MAURER
BY
ATTORNEY

United States Patent Office 3,133,486
Patented May 19, 1964

3,133,486
FOCAL PLANE SHUTTER MECHANISM
John Andrew Maurer, New Brunswick, N.J., assignor to Chicago Aerial Industries, Inc., Barrington, Ill., a corporation of Delaware
Filed June 9, 1961, Ser. No. 115,958
3 Claims. (Cl. 95—57)

This invention relates to photographic shutters of the focal plane curtain type, such as are used in aerial photographic cameras, and has as its principal object the provision of a shutter mechanism in which the width and motion of the aperture which exposes the light sensitive material are controlled with greater accuracy that has been attained in the shutters of the prior art.

An important object of the invention is to provide a shutter capable of giving exposures of exceptionally short duration.

Another object of the invention is to provide a shutter mechanism that will allow the attainment of exceptionally high curtain velocities.

Another object is to provide a shutter in which the curtain aperture travels at very nearly constant velocity during the exposure.

Still another object of the invention is to control the acceleration and deceleration of the shutter curtains in such a way that the mechanical stresses to which they are subjected are limited to values which can be sustained without damage during many cycles of operation.

Another object is to provide a shutter mechanism that will operate with a minimum of vibration.

Another object of the invention is to provide a shutter mechanism that is capable of giving many repeated exposures at short time intervals.

Still another object of the invention is to provide a shutter mechanism which can be adjusted continuously over a wide range of exposure durations.

Another object is to provide a shutter mechanism that lends itself to control by means of electrical pulses.

These and other objects of the invention, which will become apparent as the mechanism is described, are attained by a construction in which the exposing slit of the shutter is formed between the edges of two curtains, each of which is supported on two rollers. The motion of each of these two curtains is controlled by means of a train of gears connecting one of its supporting rollers with a cam follower which is maintained in contact with the periphery of a rotating cam. The shapes and relative positions of the two rotating cams control the winding of the two curtains, their acceleration to the velocity at which they expose the film, their passage at constant velocity across the picture area, and their deceleration from this operating velocity to a condition of rest prior to being rewound again.

The two control cams are not necessarily identical, but it is convenient to make them identical and to mount them side by side so that they are rotated about a common axis at equal rotary velocities.

One of these cams is driven by a direct gear train from the principal driving motor of the mechanism, while the other cam is driven from the same motor through a differential gear system so that its position in relation to the first cam may be advanced or retarded by known amounts without affecting the basic rotation of the two cams at the same speed. By retarding the second cam, a definite time interval may be established between the time when the follower on the first cam is in contact with any given point on its periphery and the time when the follower on the second cam is in contact with the corresponding point on its periphery. In the preferred form of the invention this time interval is equal to the duration of the exposure given by the shutter.

A feature which this mechanism has in common with many shutters of the prior art is that each of the two shutter curtains is attached at one end to a roller around which it is wound prior to the making of the exposure and is attached at the other end to another roller which contains a spring, similar in construction to the spring in a household shade roller, which tends to pull the curtain in such a direction as to unwind it from the first roller. The basic difference between the shutter of the present invention and these shutters of the prior art resides in this, that in the prior art the two curtains are wound on their winding end rollers, thus placing the springs in the spring rollers under tension, and then, in order to make an exposure, the winding end rollers are released, allowing the system to move under the influence of the springs. The velocity attained by the curtains at any given instant after the release of the rollers is determined by the forces exerted by the springs, by the inertias of the rollers, and by the frictions in the system. Commonly the curtains are undergoing appreciable acceleration during the actual period when the light sensitive material is being exposed, so that it is not uncommon to find that the exposure given at the end of the period is as much as 25 percent less than at the beginning of the period. At the end of the exposure period the system must be engaged by some sort of brake mechanism to bring the rollers to rest, and this brake must not act too abruptly, since the forces developed in the curtains depend on the rate of deceleration, and these forces can easily become disruptive.

In the shutter mechanism of the present invention, by contrast, the springs in the spring rollers are strong enough to accelerate the curtains and rollers to very high velocities if they were permitted to act without restraint, but in the actual operation of the shutter the accelerations and velocities of the curtains and rollers are at all times limited and controlled by the rotating cams, acting through their cam followers and the associated gear trains, so that each curtain is accelerated at a predetermined rate to a predetermined velocity; this velocity is held constant during the time required for the exposing aperture to pass completely across the picture area, and the cams then impose a predetermined deceleration which brings the curtains and rollers to rest without the occurrence of disruptive forces. Further rotation of the cams then rewinds the two curtains in preparation for the next exposure.

The invention may be better understood from the following detailed description of an illustrative embodiment thereof, taken in connection with the accompanying drawing, in which:

FIG. 1 shows a view of the complete mechanism seen from the direction of the light sensitive material; that is to say, this view is taken looking along the optical axis of the lens of any camera in which this shutter might be used, in a direction opposite to that in which the light would be traveling;

FIG. 2 shows a bottom view of the complete mechanism (as shown in FIG. 1), with the positions of some of the internal parts indicated by dotted lines;

FIG. 3 shows a view from the same direction as in FIG. 2 with the outside plate and one layer of control mechanism parts removed;

FIG. 4 shows the same view as FIG. 3 except that the therein removed layer of mechanism parts has restored;

FIG. 5 shows the structure from the same point of view as in FIGS. 2, 3 and 4, but with the cam and gear mechanism and both of the flat plates which support it removed, showing the ends of the curtain rollers and the edges of the curtains, together with other parts;

FIG. 6 shows the opposite side of the plate disclosed in FIG. 5, showing electrical control parts and the mechanism by which the amount of exposure is controlled;

Figure 9:
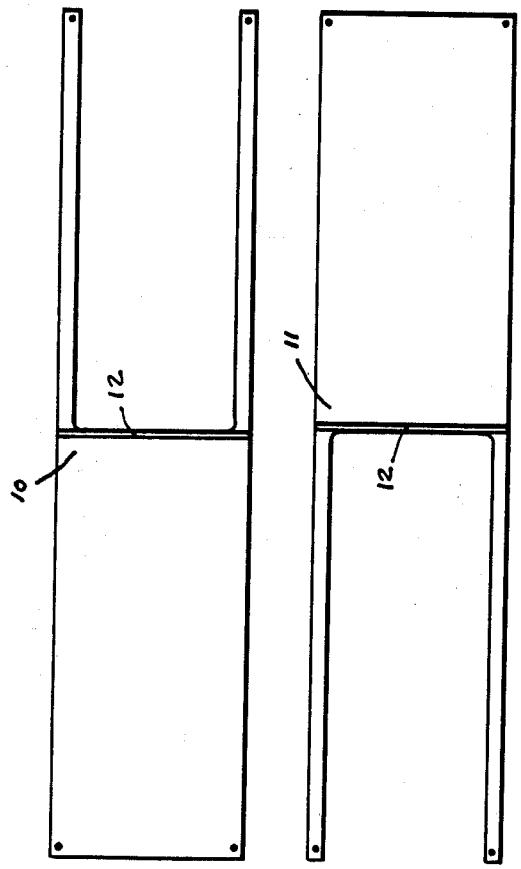
FIG. 9 shows the construction of the leading and following shutter curtains used in the mechanism.

Referring now particularly to FIG. 1, FIG. 5 and FIG. 9, the shutter curtain 10 and the following shutter curtain 11 are made of thin hard rolled metal, preferably stainless steel, and they may advantageously be in the range of .0010 to .0015 inch in thickness. Reenforcing strips of somewhat thicker spring metal 12—12 are cemented to the curtains at or near the edges which, between them, define the exposing aperture.

It will be noted that each curtain consists of a solid portion ending at the reenforcing strip and two ribbon-like edge strips which are integral with the solid portion, being produced by the cutting out of the area between them. At the ends of the ribbons and at the end of the solid portion small holes are drilled for tiny screws which are used to attach the curtains to their rollers.

The leading curtain 10 is attached by the ends of its ribbons to a winding end roller 13, and at the end of its solid portion it is attached to a spring roller 14.

The following curtain 11 is attached by the end of its solid portion to a winding end roller 15, and by the ends of its ribbons to a spring roller 16.

The spring rollers 14 and 16 are of identical construction. Referring to FIG. 1, roller 16 is made up of a sleeve 17 mounted on two end pieces 18 and 19, each of which contains a seat for a ball bearing 20, 20. The end pieces 18 and 19 may be attached to the sleeve 17 by very small screws or by cement.

By means of the ball bearings 20, 20 the roller 16 is mounted for rotation about a shaft 21 which has mounting holes bored for it in the plates 30 and 31 which are the main support plates of the entire mechanism. Shaft 21 has attached to it a collar 22 which may be held in place by a pin or otherwise firmly secured to shaft 21. To this collar 22 is attached one end of the spring 23 which actuates this roller and the following curtain.

The end piece 18 has an inwardly extending hub 24 to which the other end of spring 23 is attached. The assembly of end piece 18, shaft 21, collar 22, and spring 23, must be made before end pieces 18 and 19 are fastened into sleeve 17.

When the entire shutter mechanism has been assembled the shaft 21 is rotated by inserting a pin or key in the hole 25 until the proper amount of tension has been built up in spring 23, and the shaft 21 is then locked in position by tightening the two set screws 26, 26 which are in holes threaded in the two plates 30 and 31. In exactly the same manner the spring in roller 14 is wound to the correct tension and its shaft is locked by two set screws.

The construction of the spring rollers 14 and 16 is shown mostly in dotted lines, and is not presented in greater detail because it is not part of the invention and this construction and other equivalent ones are familiar to those skilled in the art.

The winding end rollers 13 and 15 are of identical construction. Referring to FIG. 1, roller 15 consists of a center portion 27, with enlarged ends similar to any ordinary spool. Over these enlarged ends of 27 is fitted a sleeve 17 identical with those used in rollers 14 and 16. A shaft 28 fits the center hole of 27, and is fixed firmly in relation to it by pins, set screws, or by cement. The shaft 28 extends from the outside of the third mechanism supporting plate 32 (shown also in FIG. 2) through plate 31 and roller 15, and extends beyond plate 30. Roller 13 has a shorter shaft 29 which does not extend beyond the outside of plate 30. Shafts 28 and 29 are mounted for rotation in holes in plates 30, 31 and 32, by ball bearings 33, 33, 34, 34 and 35, 35. Again this construction is shown mostly by dotted lines, and is not illustrated in greater detail because it is not part of the invention and is well known to those skilled in the art.

Referring to FIG. 5, FIG. 1 and FIGS. 3 and 4, the frame which supports this mechanism consists of the back plate 30, four long spacing studs, 40, 40, 40, 40, the middle plate 31, four short spacing studs 41, 41, 41, 41, and the front plate 32. Studs 40 are threaded on their rear ends and are screwed firmly into tapped holes in plate 30; in their front ends they are tapped to receive screws. Similarly the rear ends of studs 41 are threaded while their front ends are tapped to receive screws. Middle plate 31 is fastened to studs 40 by two screws 42, 42, and by two of the studs 41, which are in line with the lower pair of studs 40. The other two studs 41 are screwed firmly into tapped holes at the top of plate 31. Front plate 32 is fastened to the four studs 41 by four screws 43, 43, 43, 43, shown in FIG. 2. It will be noted that "back," "middle" and "front" as applied to plates 30, 31 and 32 is correct since the illustrative shutter mechanism herein disclosed is for an aerial camera in which the shutter curtains lie in a substantially horizontal plate with the camera objective directed toward the earth.

A drive motor 45 is attached to the rear, or inner side of middle plate 31; its position is shown by a dotted line in FIG. 5, in which plate 31 has been removed. The shaft of this motor projects through to the front of plate 31, and carries a pinion 46 which is shown in FIG. 3 and FIG. 4. This drive motor is of the small permanent magnet field, direct current type and carries a mechanical governor on the end of its shaft opposite the end which carries gear 46. This type of motor can be started very quickly by the application of its normal electric power, and may be stopped very quickly by removing the power and simultaneously short-circuiting the winding of the armature. Either coming up to full speed or coming to a complete stop from full speed is accomplished in less than .010 second. The running speed of such motors is normally between 11,000 and 12,000 r.p.m.

In the operation of this shutter, as will be explained in detail, each exposure is normally made by starting the motor and running it just long enough to carry the cams, previously referred to, through one revolution. The motor is then automatically stopped with the cams in a position such that a new exposure will be made as soon as the motor is started again.

FIG. 3 shows the train of gears from the motor pinion 46, to the cam 60 which controls the leading curtain 10, the parts which drive the second cam 61 and its follower, and the gears which drive the following curtain 11 having been removed.

The motor pinion 46 drives a gear 47 which is mounted on a short shaft 49 between ball bearings in plates 31 and 32. Behind gear 47, on shaft 49, is a small gear 48 which meshes with a gear 50, shown also in FIGS. 3, 4 and FIG. 7. Gear 50, in turn, meshes with gear 53 which has mounted on it the cam 60 which controls the motion of the leading curtain 10. The gear ratios are such that when the motor 45 is running at full speed gear 53 and cam 60 will make one revolution in one-sixth of a second.

The cam follower roller 62 is pressed against cam 60 by the force of the spring in roller 14, transmitted through the curtain 10, the roller 13, the shaft 29, the gear 70, mounted on 29, and the gears 64, 66 and 68 which make up a train leading from the cam follower roller to shaft 29. The gear ratios are such that when the cam follower 62 is raised from the lowest to the highest radius of cam 60 the curtain is wound a distance of slightly more than three times the width of the picture area 90, shown by dashed lines in FIG. 1.

Gear 64, which carries cam follower roller 62, has a bearing hole 72 which, in the complete assembly is supported by the rear end of shaft 73 which is a part of gear 65, shown in FIG. 4. Similarly, the compound gear 66—68 has a bearing hole 74 which, in the complete assembly, is supported by the rear end of shaft 75 which is an integral part of the compound gear 67—79. In the same way, gear 53 and cam 60 have a bearing hole 76 which is supported by the rear end of shaft 77, which is an integral part of gear 54, shown in FIG. 4. Shafts 73, 75 and 77 are supported in ball bearings in plate 31. These ball bearings correspond in size and position to bearings 78, 79 and 80 shown in FIG. 2.

Because of the relationships just described, the two layers of gears, cams, and cam followers, can be assembled directly in line with each other on their common centers of rotation, but they are capable of motion relative to each other, as is indicated in FIG. 4 by the fact that cam 61, on the top layer, is displaced with respect to cam 60 on the lower layer.

The side-by-side relationship of these two sets of gears, cams, and cam followers can be seen in that part of FIG. 1 which shows the space between plates 31 and 32. It is particularly important to note that gear 68, which derives its motion from cam 60, is in mesh with gear 70 on shaft 29, and controls the leading curtain 10, while gear 69 which derives its motion from cam 61 is in mesh with gear 71 on shaft 28 and controls the following curtain 11.

Figure 7:
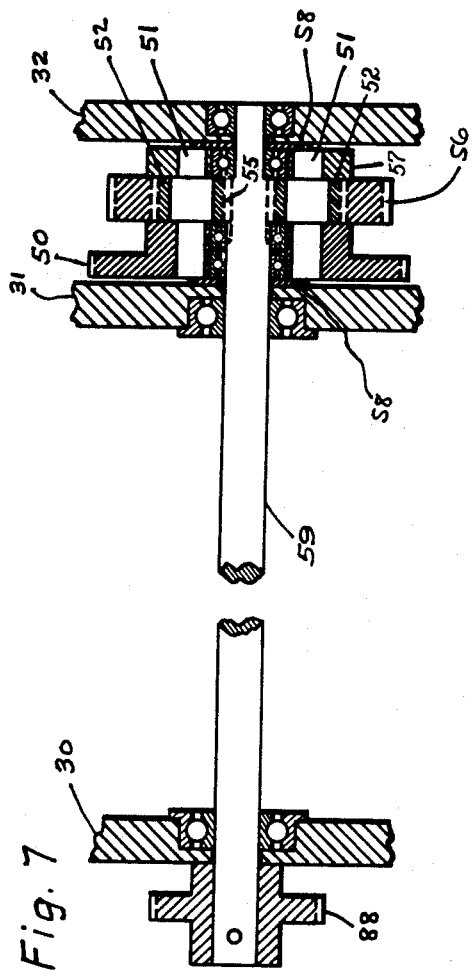
FIG. 7 is a sectional view of a differential mechanism which was also shown in FIG. 3 and FIG. 4.

Gear 50 (FIGS. 3, 4 and 7) has a raised central portion in which are bored four holes equally spaced on a common radius. Into these holes are pressed four bearing studs 51, 51, 51, 51 which, in turn, carry four planetary gears 52, 52, 52, 52. Above the four gears, in turn, is pressed on a disc 57 which has holes to match the locations of the studs 51. A "sun" gear 55 is cut in a shaft 59 which extends through ball bearings in plates 30, 31 and 32. Gear 50 and disc 57 are provided with ball bearings, as shown in FIG. 7, on which they can rotate about shaft 59 and its extension beyond gear 55 into plate 32. A ring gear 56, which has both internal and external teeth, fits around the four planetary gears 52, 52, 52, 52, as shown in FIG. 4 and FIG. 7. As is shown in FIG. 7, it is supported laterally between the raised boss on gear 50 and the disc 57. Thus the planetary gears 52 and the ring gear 56 can rotate relatively to gear 50. The arrangement of gears 50, 52, 55 and 56, with the associated parts 51 and 57, constitutes a differential; at the same time it is a means of transmitting the main motor driving action from gear 48 to gear 54, on which is mounted the cam 61 which controls the movement of the following curtain 11. When the "sun" gear is held still and the planetary gears 52 are carried around it by the rotation of gear 50, the ring gear 56 will make more revolutions than gear 50 in the ratio:

$$\frac{\text{Number of teeth on sun gear} + \text{Number of teeth on internal gear}}{\text{Number of teeth on internal gear}}$$

In order to compensate for this and arrange matters so that gear 54 will rotate in step with gear 53, the external gear on 56 is made slightly smaller than gear 50, and correspondingly gear 54 is made slightly larger than gear 53, in such a way that the overall ratio from gear 48 to gear 54 through the differential is the same as the direct ratio from gear 48 to gear 53 by way of gear 50.

If, either while the system is in motion or while it is standing still, the sun gear 55 is rotated, gear 54 will be moved relatively to gear 53. In the actual operation of the shutter this control is always used to retard gear 54, so that the follower 63 on cam 61 always reaches a given part of the cam a small amount of time later than the follower 62 on cam 60.

Figure 10:
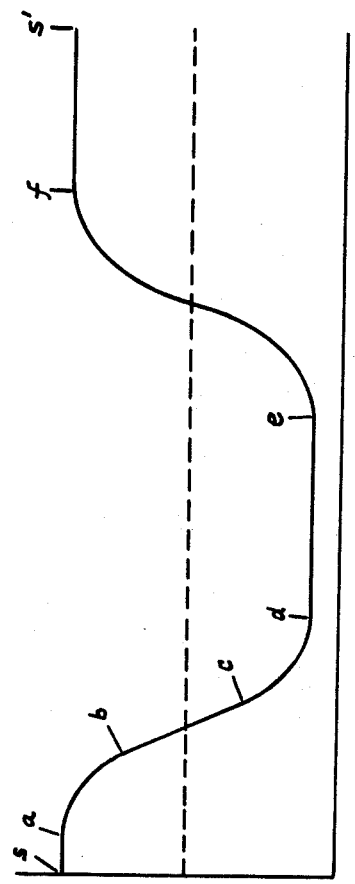
FIG. 10 is a graph showing the position of the edge of one of the curtains as a function of time during one complete exposing and rewinding cycle of the operation of the shutter.

Each of the cams 60 and 61 is shaped so that it constrains the associated curtain to move in the manner shown graphically in FIG. 10. In this figure vertical distances correspond to lengthwise positions of the reenforced edge of the curtain, the horizontal dotted line corresponding to the position of the center line of the picture area. Horizontal distances correspond to time, beginning at the time $s$ when the cycle is initiated and extending for one-sixth of a second to the time $s^1$ when the cycle ends with the shutter rewound and in readiness for a new cycle. At the time $s$ the cam follower is on the concentric portion of maximum radius on the cam. When the cam has rotated a short distance, at the time represented by the point $a$ on the curve, the cam follower begins to move inward. This allows the springs in roller 14 or roller 16, as the case may be, to pull the curtains to the left in FIG. 1. During the time interval from $a$ to $b$ the cam is shaped to allow constant acceleration of the curtains at a predetermined rate. This rate must not be quite as high as the acceleration that would be imparted by the springs if the rollers were free; if at any point it becomes too high the cam follower will not be kept in contact with the cam, and severe bouncing of the entire system with development of disruptive stresses in the ribbon portions of the curtains will occur.

Assuming that the springs in rollers 14 and 16 are strong enough, at the time $b$ the curtains will have reached a predetermined velocity and at the same time the slit formed between them will have almost reached the picture area. The velocity attained can be as high as 400 inches per second.

Between time $b$ and time $c$, as is shown by the straight line part of the curve in FIG. 10, the cam is shaped to constrain the curtain to move with zero acceleration, that is, at constant velocity. It is in this part of the cycle that the exposure is made.

Between time $c$ and time $d$ the cam imposes a controlled deceleration, so that the curtain is brought to rest at the time $d$.

Between time $d$ and time $e$ the cam follower is on the concentric portion of minimum radius of the cam. The curtain remains at rest.

At time $e$ the relationship of the cam and cam follower is as shown in FIGS. 2, 3 and 4. The cam follower is just about to be lifted by the rising portion of the cam, which imparts a winding action of the general type shown between $e$ and $f$. At $f$ the follower again rests on the concentric portion of maximum radius on the cam, and the curtain is at rest in the fully wound position. Shortly after time $f$ the control system, presently to be described, cuts off the power from the motor and short circuits its armature. This imposes a strong braking action on the motor, and the system comes to rest at the time $s^1$ in the same condition as that which existed at time $s$. The shutter is now in readiness for a new cycle.

From what has been explained it may readily be seen that if the two cams 60 and 61 were brought exactly into line with each other and if the two shutter curtains at the same time were adjusted so that their reenforced edges just touched, the entire mechanism might be operated by the motor and the two curtains would move back and forth in accordance with the curve of FIG. 10, but since the edges of the curtains would remain just in contact throughout the cycle, no exposure would be given to the light sensitive material in the camera.

If, however, the differential is brought into use by rotating the sun gear 55 so as to retard the cam 61 by an amount corresponding, for example, to $\frac{1}{1000}$ of a second, the shutter will now give an exposure of $\frac{1}{1000}$ of a second, since the edge of curtain 11 will now lag behind that of curtain 10 by that amount of time. Another way of describing what happens is to say that this lag of curtain 11 causes a slit to appear of just such width as to give an exposure of $\frac{1}{1000}$ of a second at the velocity at which the curtains are traveling when they make the exposure.

In the same way, it may be seen that by whatever time interval the cam 61 is retarded with reference to cam 60, the same time interval will be the duration of the exposure. The limit is reached with an exposure of about $\frac{1}{25}$ second, after which the leading curtain begins to return before the following curtain has been allowed to run all the way down.

In any focal plane shutter a practical matter of great importance is the "capping" of the shutter, that is, the closure of the slit during the rewinding of the curtains. Usually some special provision must be made to accomplish this. In the mechanism of the present invention the capping action occurs automatically, since the curtain that comes down first is rewound first. This overlaps the ends of the curtains during the rewind period so that no light can reach the sensitive material.

Actual control of the exposure given by the shutter can be carried out either by manual control of the sun gear 55 or in accordance with modern practice by a servo motor system, as illustrated in FIG. 5 and FIG. 6. A servo motor 81 is supported by plate 30. Its shaft extends through the plate and carries a worm 82 which meshes with a gear 83 on a diagonal shaft 85. This shaft is supported on bearings 84 and 86. On the other end of shaft 85 is another worm 87 which meshes with a gear 88 on shaft 59 which carries the sun gear 55. The position of the sun gear is transmitted by gears 89 and 95 to a potentiometer 96, which is part of the servo control system. Since this type of positional servo system is well known it need not be described further.

FIG. 6 also shows the mechanism by which the shutter is made to operate in response to electrical pulses. The rear end of shaft 28 carries a gear 100, which may also be seen in FIG. 1. This meshes with a gear 101 on which is mounted a circular cam 102 having a single rather broad notch cut in its edge. A cam follower mounted on a pivoted lever 103 is arranged to drop into this notch. The gears 100 and 101 are meshed in such a relation that when the shutter curtain on the roller connected with gear 100 is fully wound the cam follower roller is in the notch as shown in this figure. A small snap action switch 106 is located in relation to the lever 103 in such a way that with the cam follower roller in the notch as shown the switch is "open," but if gear 101 is rotated so as to bring the cam follower roller on the larger diameter of cam 102 the switch 106 is "closed." What this signifies is more clearly shown in the circuit diagram, FIG. 8, which shows the same parts.

A solenoid of the "push" type 104 is connected to lever 103 in such a way that when it is actuated by an electrical pulse applied to the circuit $p_1$ it causes the switch 106 to reverse its contacts. As may be seen from the diagram, this applies power from the circuit marked + (plus) to the motor 45. As soon as the motor 45 begins to run and the curtains begin to move the cam 102 is rotated so as to hold switch 106 closed even if the pulse on $p_1$ is discontinued.

A second cam follower on a lever 108 is arranged so that when the notch in cam 102 is brought around to it it closes snap switch 107. This connects the + (plus) side of the power line to the circuit marked $p_2$, sending an output pulse to associated equipment such as a camera mechanism, which, for example, may need to be told when to advance a new length of film. The time when the notch reaches the cam follower on lever 108 will be correct for this, since the notch will reach 108 when the follower curtain has run down and therefore the exposure is over.

Figure 8:
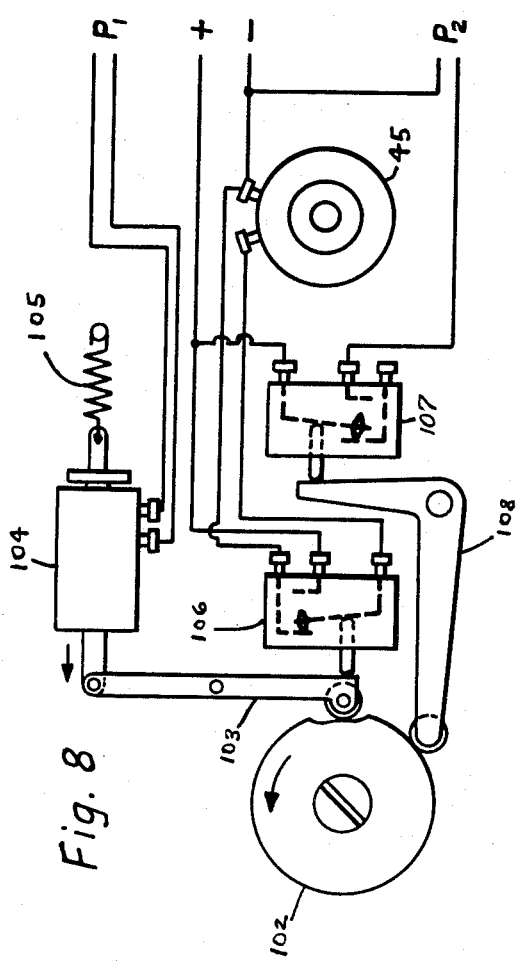
FIG. 8 is a schematic drawing of the electrical circuit by which the operation of the camera is controlled.

Meanwhile motor 45 continues to run and the shutter curtains are rewound. When they are fully rewound the notch in cam 102 will again come under the roller on lever 103, and the spring 105 will pull lever 103 away from the switch 106, allowing the contacts to return to the position in which they are shown in FIG. 8. It may be seen that this disconnects the motor 45 from the power line and at the same time short circuits the motor. The motor, therefore, stops in a short interval of time, leaving the shutter in readiness to make a new exposure as soon as a new pulse is received on the line marked $p_1$. If, however, the power applied to the solenoid 104 through the pulse circuit $p_1$ is held on continuously instead of being applied in discrete short pulses, the motor will be energized continuously through switch 106 and the shutter will be carried through a continuous series of cycles so that exposures will be made at the rate of six per second. This is commonly referred to as "runaway" operation.

From the above description it will be apparent that if the speed of the main driving motor 45 is controlled accurately, which may be done by well known types of governors, if the cams 60 and 61 are made accurately to the proper shapes, and if the gears 64, 66, 68, 70, 65, 67, 69 and 71 are precisely made, the motions of the two shutter curtains will be controlled accurately, and, in fact, this accuracy can easily be of a higher order than has been attained in shutters of the prior art in which the motion is determined by spring tensions, moments of inertia, and frictional losses of power in the curtain roller systems.

Because of the accurate control that is exercised, it is possible to accelerate the curtains uniformly for relatively long periods of time at high rates of acceleration, and in this way it is possible to reach exceptionally high curtain velocities which are held constant during the period of actual exposure of the light sensitive material. The attainment of high curtain velocities in turn makes it possible to give exposures of exceptionally short duration while employing aperture widths that are large enough to be controlled with high percentage accuracy.

Since the motions of the curtains and the rollers and gears associated with them are controlled continuously throughout each cycle of operation, and there are no impacts such as the one that is necessarily associated with the engagement of a brake mechanism in the shutters of the prior art, the operation of the shutter is attended by little vibration.

Since the sun gear, acting through the other parts of the differential, exercises a continuous control over the position of cam 61 relative to cam 60, or, otherwise stated, over the width of the exposing aperture between the reenforced edges of the two shutter curtains, the shutter is able to give a wide continuous range of exposure durations.

By the action of the electrical and mechanical parts shown in FIGS. 6 and 8, the shutter is able to respond to electrical pulses arriving at either regular or irregular intervals, and can give many repeated exposures at time intervals which in pulsed operation may be as short as one-fifth of a second in the mechanism of the illustrative example described, or as short as one-sixth of a second in "runaway" operation.

The described embodiment of my instant invention is, as has been stated, illustrative thereof but not in any way restricted, and the invention is limited only as in the claims hereof.

What I claim is:

1. A focal plane shutter mechanism comprising a leading curtain and a following curtain, a first rotating cam and a cam follower and a gear train by which the first cam controls movement of the leading curtain in both directions between two extreme positions, a second rotating cam and a second cam follower and a second gear train by which the second cam controls movement of the following curtain in both directions between two extreme positions, motor driving means adapted to impart rotation to both the first cam and the second cam, and a differential gear mechanism between the motor and the second cam for selectively positioning the second cam in advance and in retard relative to the position of the first cam.

2. A focal plane shutter mechanism according to claim 1 in which the cycle of motion of each curtain as controlled by its associated cam includes a portion during which the curtain is accelerated from rest to a maximum velocity, a succeeding portion during which the curtain continues to move uniformly at this maximum velocity, a further succeeding portion during which the curtain is decelerated from the said maximum velocity to rest, and a still further succeeding portion during which the curtain is moved in the opposite direction back to its initial position of rest.

3. A focal plane shutter mechanism according to claim 1 with the addition of a snap action switch having a first position in which electrical power is not applied to the motor and a second position in which electrical power is applied to the motor through said switch, a solenoid linked to said snap switch by a lever in such a way that when electrical power is applied to the solenoid the switch is moved from its first position to its second position, an electrical control cam connected through gears to the follower curtain of the shutter, and a cam follower, said follower and said lever linking said electrical control cam with the snap action switch, said electrical control cam having a portion which is in operative relation with said cam follower when the following curtain of the shutter is in one of its extreme positions, the operative relation being such that the snap action switch is permitted to be in its first or its second position, and said electrical control cam having a second portion which is in operative relation with the said cam follower whenever the following shutter curtain is in any position more than a small distance away from its said extreme position, the operative relation over this second portion of the cam being such that the snap action switch is held in its second position.

References Cited in the file of this patent
UNITED STATES PATENTS

| | | |
|---|---|---|
| 2,134,766 | Schieber et al. | Nov. 1, 1938 |
| 2,186,614 | Mihalyi | Jan. 9, 1940 |
| 2,891,455 | Stein et al. | June 23, 1959 |